United States Patent
Tan et al.

(10) Patent No.: US 8,176,400 B2
(45) Date of Patent: May 8, 2012

(54) SYSTEMS AND METHODS FOR ENHANCED FLAW SCAN IN A DATA PROCESSING DEVICE

(75) Inventors: Weijun Tan, Longmont, CO (US); Shaohua Yang, Santa Clara, CA (US); Hongwei Song, Longmont, CO (US); Richard Rauschmayer, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 442 days.

(21) Appl. No.: 12/556,180

(22) Filed: Sep. 9, 2009

(65) Prior Publication Data

US 2011/0058631 A1   Mar. 10, 2011

(51) Int. Cl.
H03M 13/00   (2006.01)

(52) U.S. Cl. .................................... 714/791; 714/767

(58) Field of Classification Search .............. 324/212; 382/100; 360/31; 714/752, 772, 774, 791, 714/767
See application file for complete search history.

(56) References Cited

U.S. PATENT DOCUMENTS

| | | | |
|---|---|---|---|
| 6,065,149 A | 5/2000 | Yamanaka | |
| 6,353,315 B1 * | 3/2002 | Egan et al. | 324/212 |
| 6,691,263 B2 | 2/2004 | Vasic et al. | |
| 6,738,948 B2 | 5/2004 | Dinc et al. | |
| 6,810,131 B2 * | 10/2004 | Nakagawa et al. | 382/100 |
| 6,980,382 B2 | 12/2005 | Hirano et al. | |
| 7,154,936 B2 | 12/2006 | Bjerke et al. | |
| 7,168,030 B2 | 1/2007 | Ariyoshi | |
| 7,203,015 B2 | 4/2007 | Sakai et al. | |
| 7,237,173 B2 | 6/2007 | Morita et al. | |
| 7,254,192 B2 | 8/2007 | Onggosanusi | |
| 7,257,172 B2 | 8/2007 | Okamoto et al. | |
| 7,359,313 B2 | 4/2008 | Chan et al. | |
| 7,441,174 B2 | 10/2008 | Li et al. | |
| 7,688,915 B2 | 3/2010 | Tanrikulu et al. | |
| 7,817,363 B2 * | 10/2010 | O'Brien et al. | 360/31 |
| 7,952,824 B2 * | 5/2011 | Dziak et al. | 360/31 |
| 2003/0063405 A1 | 4/2003 | Ming et al. | |
| 2007/0061687 A1 | 3/2007 | Hwang | |

(Continued)

FOREIGN PATENT DOCUMENTS

JP   10-145243   5/1998

(Continued)

OTHER PUBLICATIONS

U.S. Appl. No. 12/425,626, filed Apr. 17, 2009, Weijun Tan.

(Continued)

Primary Examiner — David Ton
(74) Attorney, Agent, or Firm — Hamilton, DeSanctis & Cha

(57) ABSTRACT

Various embodiments of the present invention provide systems and methods for flaw scan in a data processing system. As one example, a data processing system is disclosed that includes a data detector circuit, a bit sign inverting circuit, and an LDPC decoder circuit. The data detector circuit receives a verification data set that is an invalid LDPC codeword, and applies a data detection algorithm to the verification data set to yield a detected output. The bit sign inverting circuit modifies the sign of one or more elements of a first derivative of the detected output to yield a second derivative of the detected output. The second derivative of the detected output is an expected valid LDPC codeword. The LDPC decoder circuit applies a decoding algorithm to the second derivative of the detected output to yield a decoded output.

22 Claims, 9 Drawing Sheets

U.S. PATENT DOCUMENTS

| | | |
|---|---|---|
| 2008/0104474 A1* | 5/2008 | Gao et al. .................. 714/752 |
| 2009/0235116 A1 | 9/2009 | Tan et al. |
| 2009/0235146 A1 | 9/2009 | Tan et al. |
| 2009/0268575 A1 | 10/2009 | Tan et al. |
| 2009/0268848 A1 | 10/2009 | Tan et al. |
| 2009/0271670 A1 | 10/2009 | Tan et al. |
| 2010/0042877 A1 | 2/2010 | Tan |
| 2010/0074078 A1 | 3/2010 | Cao et al. |

FOREIGN PATENT DOCUMENTS

JP  2007/087529  4/2007

OTHER PUBLICATIONS

U.S. Appl. No. 12/399,679, filed Mar. 6, 2009, Dziak, Scott.
U.S. Appl. No. 12/399,713, filed Mar. 6, 2009, Weijun Tan.
U.S. Appl. No. 12/399,750, filed Mar. 6, 2009, Weijun Tan.
U.S. Appl. No. 12/425,824, filed Apr. 17, 2009, Shaohua Yang.

\* cited by examiner

SYSTEMS AND METHODS FOR ENHANCED FLAW SCAN IN A DATA PROCESSING DEVICE

BACKGROUND OF THE INVENTION

The present invention is related to data processing systems, and more particularly to systems and methods for identifying flaws in a channel or circuit associated with a data processing system.

FIG. 1A shows a prior art data transfer system 100 including a low density parity check encoder (LDPC encoder) 110 that encodes user data 105 to create an encoded output 115. Encoded output 115 is transferred to a data detector 130 via a channel 120. Channel 120 may be, for example, a storage medium or a transmission medium. Data detector 130 performs a data detection on the received data to provide a detected output 135. Detected output 135 is provided to an LDPC decoder 140. The result of LDPC decoder 140 is provided as a transferred user data 145. As shown in FIG. 1B, encoded output 115 includes user data 105 that is augmented with LDPC data 150 during the encoding performed by LDPC encoder 110. User data 105 is 'N' bits in length. The combination of user data 105 and LDPC data 150 is 'K' bits in length, and LDPC data 150 includes various parity information that may be used to decode the user data. In a typical operation, a user data pattern is provided via user data 105 to LDPC encoder 110. This data is encoded and processed through the other blocks. Where the operation is successful, transferred user data 145 is the same as the originally provided user data 105. The ability to test the channel and other aspects of the system is somewhat limited.

Hence, for at least the aforementioned reasons, there exists a need in the art for advanced systems and methods for identifying defective regions on a storage medium and/or in data processing circuitry.

BRIEF SUMMARY OF THE INVENTION

The present invention is related to data processing systems, and more particularly to systems and methods for identifying flaws in a channel or circuit associated with a data processing system.

Various embodiments of the present invention provide data processing systems that include a data input and a verification input. A selector circuit selects either a derivative of the data input or a derivative of the verification input to be provided as a selected input to a channel. A detector circuit applies a data detection algorithm to an output from the channel to yield a detected output; and a decoder circuit applies a decoding algorithm to a derivative of the detected output to yield a decoded output.

In some instances of the aforementioned embodiments, the decoder circuit is an LDPC decoder circuit and the derivative of the data input is the data input and the derivative of the verification input is the verification input. In such instances, the selected input is provided to the channel via an LDPC encoder circuit such that the data received by the channel is a valid LDPC codeword. In one or more instances of the aforementioned embodiments, the data processing system further includes a media defect detection circuit and a soft output data modification circuit. The media defect detection circuit is operable to receive the output from the channel and to assert a media defect flag when a flaw in the channel is detected. The soft output data modification circuit is operable to modify the detected output for periods corresponding to assertion of the media defect flag to yield the derivative of the detected output.

In some instances of the aforementioned embodiments, the decoder circuit is an LDPC decoder circuit and the derivative of the verification input is the verification input. In such instances, the system may include an LDPC encoder circuit that encodes the data input to yield the derivative of the data input. In such cases, the selected input is a valid LDPC codeword when the derivative of the data input is provided as the selected input to the channel. In other instances, the selected input is an invalid LDPC codeword when the derivative of the verification input is provided as the selected input to the channel.

In some cases, the derivative of the detected output is a first derivative of the detected output and the selector circuit is a first selector circuit. In such cases, a bit sign inverting circuit modifies the sign of one or more elements of a second derivative of the detected output to yield a third derivative of the detected output, and a second selector circuit that selects one of the second derivative of the detected output and the third derivative of the detected output to be provided as the first derivative of the detected output. In particular cases, the second selector circuit selects the second derivative of the detected output to be provided as the first derivative of the detected output when the first selector circuit selects the derivative of the data input to be provided as a selected input to a channel, and the second selector circuit selects the third derivative of the detected output to be provided as the first derivative of the detected output when the first selector circuit selects the derivative of the verification input to be provided as a selected input to a channel. In one or more particular cases, the third derivative of the detected output is an expected valid LDPC codeword. In such cases, the bit sign inverting circuit modifies the sign of each element of the second derivative of the detected output that corresponds to a '1' in the verification input.

Other embodiments of the present invention provide data processing systems that include a data detector circuit, a bit sign inverting circuit, and an LDPC decoder circuit. The data detector circuit receives a verification data set that is an invalid LDPC codeword, and applies a data detection algorithm to the verification data set to yield a detected output. The bit sign inverting circuit modifies the sign of one or more elements of a first derivative of the detected output to yield a second derivative of the detected output. The second derivative of the detected output is an expected valid LDPC codeword. The LDPC decoder circuit applies a decoding algorithm to the second derivative of the detected output to yield a decoded output. In some cases, the bit sign inverting circuit is a first bit sign inverting circuit, and the data processing circuit further includes a second bit sign inverting circuit that modifies the sign of one or more elements of the decoded output to yield a modified output. In some such cases, the first bit sign inverting circuit modifies the sign of each element of the first derivative of the detected output that corresponds to a '1' in the verification data set, and the second bit sign inverting circuit modifies the sign of each element of the decoded output that corresponds to a '1' in the verification data set.

Yet other embodiments of the present invention provide methods for data processing that includes receiving a verification data set that is an invalid LDPC codeword; applying a data detection algorithm to the verification data set to yield a detected output; modifying the sign of one or more element of the first derivative of the detected output to yield a second derivative of the detected output; and applying an LDPC decoding algorithm to the second derivative of the detected output. The second derivative of the detected output is an expected valid LDPC codeword. In some cases, the methods further include modifying the sign of one or more element of the first derivative of the detected output includes modifying the sign of each element of the first derivative of the detected output that corresponds to a '1' in the verification data set.

Yet further embodiments of the present invention provide hard disk drive systems that include a storage medium, a read/write head assembly disposed in relation to the storage medium, and a read channel circuit. The read channel circuit receives a verification data set from the storage medium via the read/write head assembly. The verification data set is an invalid LDPC codeword. The read channel circuit includes: a data detector circuit, a bit sign inverting circuit, and an LDPC decoder circuit. The data detector circuit receives the verification data set that is an invalid LDPC codeword, and the data detector circuit applies a data detection algorithm to the verification data set to yield a detected output. The bit sign inverting circuit modifies the sign of one or more elements of a first derivative of the detected output to yield a second derivative of the detected output, and wherein the second derivative of the detected output is an expected valid LDPC codeword. The LDPC decoder circuit applies a decoding algorithm to the second derivative of the detected output to yield a decoded output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to data processing systems, and more particularly to systems and methods for identifying flaws in a channel or circuit associated with a data processing system.

Various embodiments of the present invention provide data processing systems that include a data input and a verification input. A selector circuit selects either a derivative of the data input or a derivative of the verification input to be provided as a selected input to a channel. As used herein, the term "derivative" is used in its broadest sense to mean a signal or data set derived from another signal or data set. As an example, a signal derived from another signal and the signal from which it is derived may be the same signal. Similarly, a data set derived from another data set and the data set from which it is derived may be the same data set. As another example, a signal derived from another signal may be the signal from which it is derived after some processing such as, for example, encoding, decoding, bit modification or the like. Similarly, a data set derived from another data set may be the data set from which it is derived after some processing such as, for example, encoding, decoding, bit modification or the like. Based upon the disclosure provided herein, one of ordinary skill in the art will recognize a variety of signals and data sets, and derivatives thereof that may be used in relation to different embodiments of the present invention. A detector circuit applies a data detection algorithm to an output from the channel to yield a detected output; and a decoder circuit applies a decoding algorithm to a derivative of the detected output to yield a decoded output.

Other embodiments of the present invention provide data processing systems that include a data detector circuit, a bit sign inverting circuit, and an LDPC decoder circuit. The data detector circuit receives a verification data set that is an invalid LDPC codeword, and applies a data detection algorithm to the verification data set to yield a detected output. The bit sign inverting circuit modifies the sign of one or more elements of a first derivative of the detected output to yield a second derivative of the detected output. The second derivative of the detected output is an expected valid LDPC codeword. The LDPC decoder circuit applies a decoding algorithm to the second derivative of the detected output to yield a decoded output. As used herein, the phrase "invalid LDPC codeword" is used in its broadest sense to mean any data set that is not a valid LDPC codeword. As used herein, the phrase "expected valid LDPC codeword" is used to mean a data set that would be a valid LDPC codeword after processing by the bit sign inverting circuit if no interim error was introduced to the data set provided to and processed by the bit sign inverting circuit.

Figure 1A:
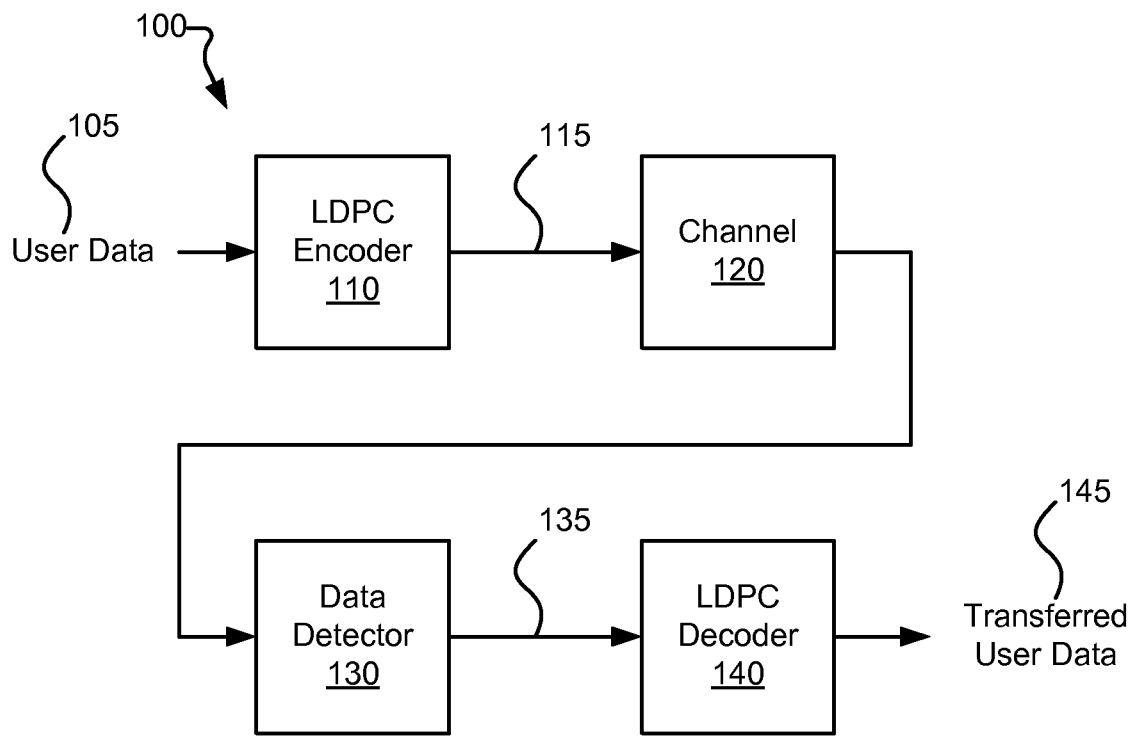
FIG. 1A depicts a prior art data processing system.
Figure 1B:
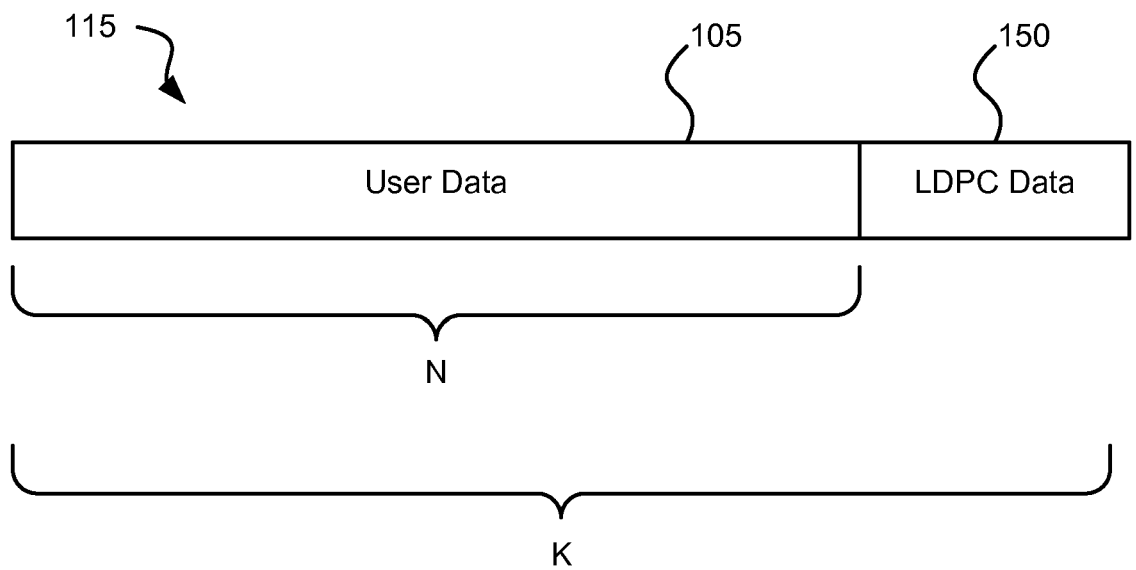
FIG. 1B shows an exemplary valid LDPC codeword that may be produced and transferred using the data processing system of FIG. 1A.
Figure 2:
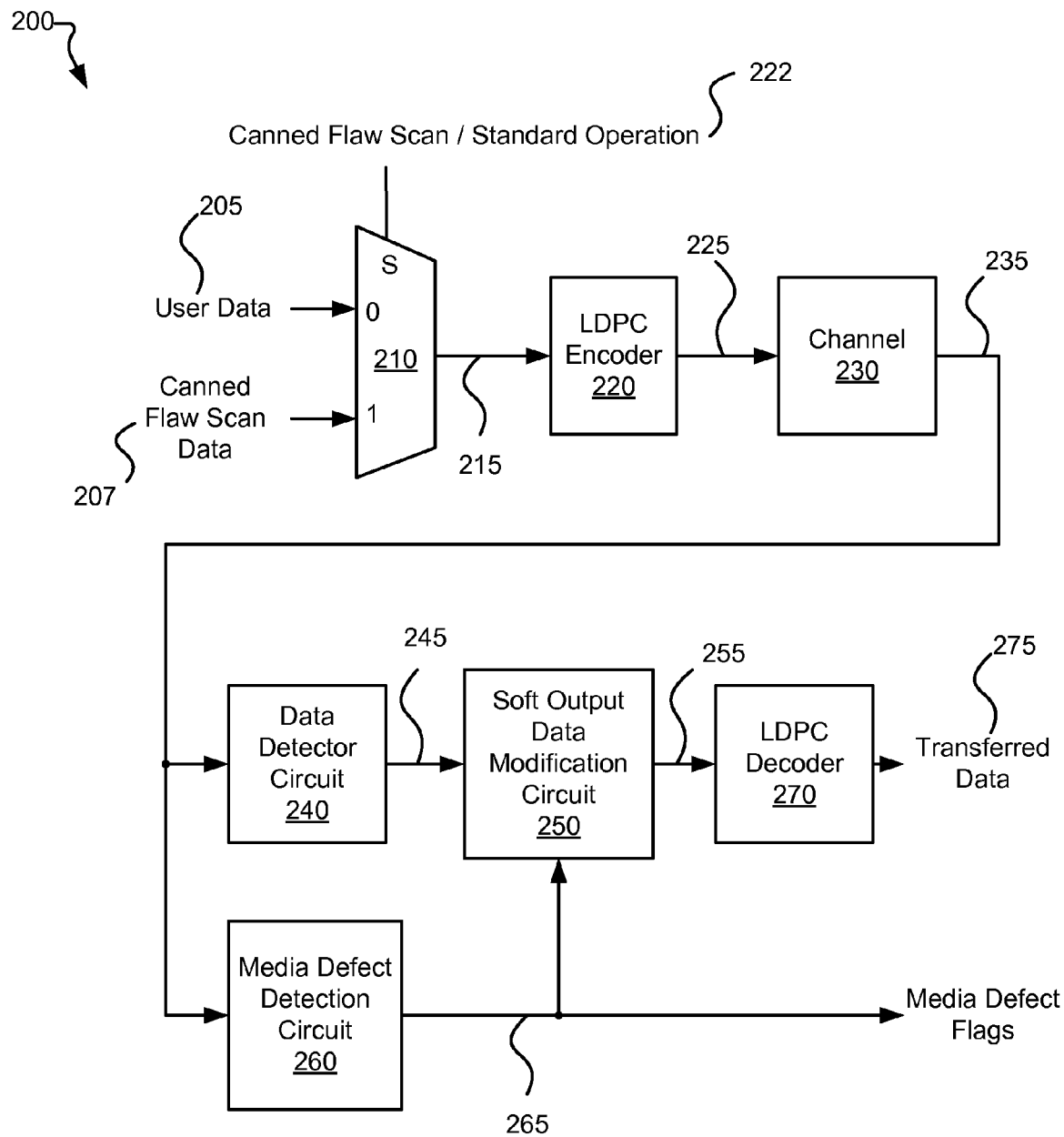
FIG. 2 is a block diagram of a data processing system including flaw scan circuitry in accordance with one or more embodiments of the present invention.

Turning to FIG. 2, a block diagram of a data processing system 200 including flaw scan circuitry in accordance with one or more embodiments of the present invention. Data processing system 200 includes a multiplexer circuit 210 that receives a user data input 205 or a canned flaw scan input 207. User data input 205 includes user data that is being introduced to the system. Such user data may be any user data that is to be processed by the system. Canned flaw scan input 207 is a test pattern that is used to perform a flaw scan on a channel 230. In some embodiments of the present invention, canned flaw scan input 207 provides a known periodic data pattern that facilitates performance of a flaw scan test. In some embodiments of the present invention, a 2 T pattern is used (i.e., 001100110011 . . . ). In other embodiments of the present invention, a 4 T pattern is used (i.e., 00001111000011-11 . . . ). It should be noted that non-periodic patterns may also be used. Based upon the disclosure provided herein, one of ordinary skill in the art will recognize a variety of patterns that may be introduced to data processing system 200 as canned flaw scan input 207. A canned flaw scan/standard operation input 222 is provided to a select input of multiplexer circuit 210 and selects a system data input 215 to be either user data input 205 or canned flaw scan input 207 depending upon whether a flaw scan or standard operation is desired.

System data input 215 is provided to an LDPC encoder circuit 220 that performs an LDPC encoding to yield an encoded output 225. The encoded output is whatever data was provided (either user data or canned flaw scan data) augmented with LDPC data as is known in the art. LDPC encoder circuit 220 may be any LDPC encoder circuit known in the art. Based upon the disclosure provided herein, one of ordinary skill in the art will recognize a variety of LDPC encoder circuits that may be used in relation to different embodiments of the present invention. Encoded output 225 is provided to channel 230 that provides a channel output 235 to a data detector circuit 240 and a media defect detector circuit 260. Channel 230 may be any channel including, but not limited to, a storage medium.

Media defect detector circuit 260 performs a media defect detection on channel output 235. When a media defect is identified by media defect detector circuit 260, one or more media defect flags 265 are asserted. In one embodiment of the present invention, media defect detector circuit 460 may be implemented in accordance with that discussed below in relation to FIG. 8. It should be noted that other embodiments of the present invention may use different types of media defect detectors. For example, other embodiments of the present invention may be implemented consistent with those discussed in U.S. patent application Ser. No. 12/399,713 entitled "Systems and Methods for Media Defect Detection" and filed Mar. 6, 2009 by Tan et al. The entirety of the aforementioned application is incorporated herein by reference for all purposes.

Data detector circuit 240 applies a data detection algorithm to channel output 235 and provides a resulting detected output 245. Data detector circuit 240 may be any data detector circuit known in the art. In one embodiment of the present invention, data detector circuit 240 is a maximum a posteriori data detector circuit or a Viterbi algorithm detector circuit as are known in the art. Based upon the disclosure provided herein, one of ordinary skill in the art will recognize a variety of data detector circuits that may be used in relation to different embodiments of the present invention.

Detected output 245 is provided to a soft output data modification circuit 250. Soft output data modification circuit 250 operates to modify a soft output portion of detected output 245 based upon media defect flags 265. The soft output portion indicates a likelihood that a particular bit has been properly detected. Thus, where a media defect is indicated by media defect flags 265, the soft output portion of detected output 245 is modified for the bits corresponding to the identified media defect to indicate a reduced likelihood that the particular bits were properly detected. The following pseudocode describes the modification:

```
If (media defect flags indicate no media defect){
        modified output 255 = detected output 245
}
Else If (media defect flags indicate a media defect){
        modified output 255 = α*channel output 235
}
``` where $\alpha<1$. Modifying the soft output portion corresponding to an identified media defect increases the probability that bits corresponding to the identified media defect will be changed downstream in an effort to identify the originally transmitted data. Such an approach increases the potential of convergence.

Soft output data modification circuit 250 provides a modified output 255 to an LDPC decoder circuit 270. LDPC decoder circuit 270 applies an LDPC decoding algorithm to modified output 255 and provides a resulting transferred data 275. The process is considered to have converged when transferred data 275 is the same as the corresponding original system data input 215. LDPC decoder circuit 270 may be any LDPC decoding circuit known in the art. Based upon the disclosure provided herein, one of ordinary skill in the art will recognize a variety of LDPC decoder circuits that may be used in relation to different embodiments of the present invention.

Among other things, data processing system 200 provides an ability to select a canned flaw scan input 207 that may be particularly tailored for performing a flaw scan. Such a flaw scan may operate to detect one or more regions or portions of channel 230 that are not operating properly. The inoperative regions may be identified by differences in the canned flaw scan input 207 and the decoded transferred data 275. In particular embodiments of the present invention, canned flaw scan input 207 may be programmed as a periodic pattern that may provide for a relatively easy determination of if and where a flaw in channel 230 occurs. In particular, where a violation in the periodic pattern is detected, a potential flaw in channel 230 is indicated at the location (e.g., address on a storage medium) from which that portion of the periodic pattern was derived.

In some embodiments of the present invention, soft output data modification circuit 250 is turned off. In such cases, detected output 245 is passed through without change and provided as modified output 255. In such cases, either assertion of one or more of media defect flags 265 or a failure of the periodic pattern represented in transferred data 275 indicates a potential flaw in channel 230.

Figure 3:
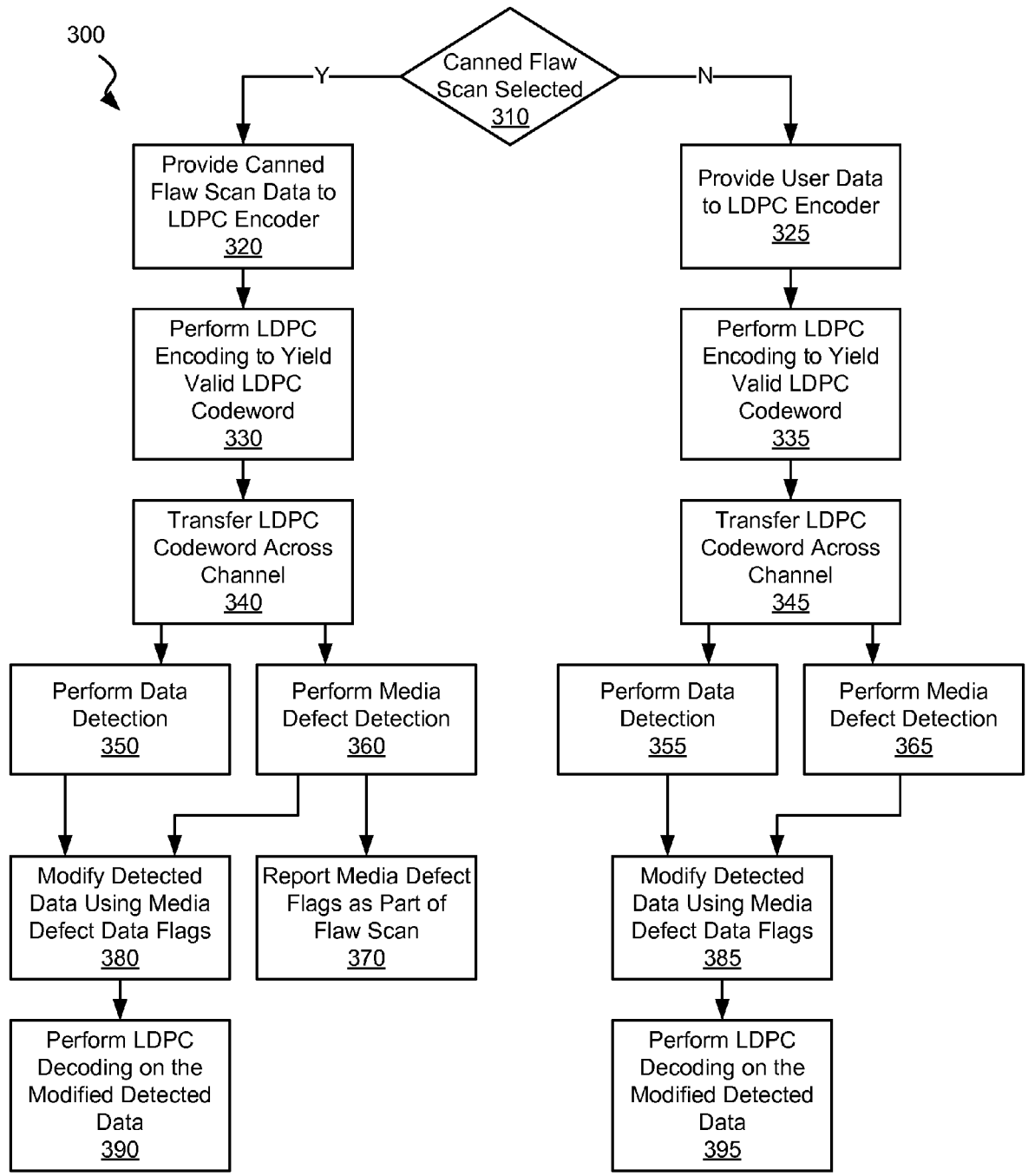
FIG. 3 is a flow diagram showing a method for flaw scan processing in accordance with some embodiments of the present invention.

Turning to FIG. 3, a flow diagram 300 shows a method for flaw scan processing in accordance with some embodiments of the present invention. Following flow diagram 300, it is determined whether a canned flaw scan process or standard operational mode is selected (block 310). Such a selection may be made by, but is not limited to, a signal input that is asserted one way or another depending upon the mode selected or by programming a user register with a value indicating the selection of one mode or the other. Based upon the disclosure provided herein, one of ordinary skill in the art will recognize a variety of techniques that may be used for selecting an operational mode in accordance with different embodiments of the present invention.

Where a canned flaw scan process is selected (block 310), canned flaw scan data is provided to an LDPC encoder circuit (block 320). LDPC encoding is performed on the received canned flaw scan data to yield a valid LDPC codeword (i.e., an encoded data set) (block 330). The valid LDPC codeword is then transferred across a channel (block 340). The channel may be, for example, a storage medium or other channel as are known in the art. Where the channel is a storage medium, transferring the valid LDPC codeword through the channel includes writing the codeword to a defined location on the storage medium, and reading the LDPC codeword back from the defined location on the storage medium. Such a read/write process may be done using any read/write circuitry and/or processes known in the art.

A data detection process is performed on the LDPC codeword received via the channel (block 350). The detection process may be performed using any data detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention. In parallel, a media defect detection process is applied to the LDPC codeword received via the channel (block 360). The media defect detection process may be any defect detection process known in the art that is capable of identifying one or more media defects associated with the channel over which the LDPC codeword was transferred. Any media defects identified by the media defect detection process (block 360) are indicated by asserting one or more media defect flags that are reported as part of the flaw scan process (block 370). In addition, any media defect flags generated by the media defect detection process are used to modify the output from the data detection process (block 380). The output of the data detection process includes soft data indicating the likelihood that corresponding bits have been properly detected. Thus, where a media defect is indicated by media defect flags, the soft output portion of detected output is modified for the bits corresponding to the identified media defect to indicate a reduced likelihood that the particular bits were properly detected. The following pseudo-code describes the modification:

```
If (media defect flags indicate no media defect){
    modified output 255 = detected output 245
}
Else If (media defect flags indicate a media defect){
    modified output 255 = α*channel output 235
}
``` where α<1. The output of the detection process including the modified soft data is provided to an LDPC decoder circuit where an LDPC decoding algorithm is applied to the data (block 390). The LDPC decoding algorithm may be any LDPC decoding algorithm known in the art. The results of the LDPC decoding algorithm are compared against the canned flaw scan data. At any location where the comparison is not equal, it is assumed that there is a flaw in the channel corresponding to that location. Thus, either or both of an inequality between the output of the LDPC decoding process or an assertion of one or more of the media defect flags may be used to indicate a flaw on the in the channel.

Alternatively, where a standard operation process is selected (block 310), user data is provided the LDPC encoder circuit (block 325). LDPC encoding is performed on the received user data to yield a valid LDPC codeword (i.e., an encoded data set) (block 335). The valid LDPC codeword is then transferred across the channel (block 345). A data detection process is performed on the LDPC codeword received via the channel (block 355). Again, the detection process may be performed using any detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention.

In parallel, the media defect detection process is applied to the LDPC codeword received via the channel (block 365). Again, the media defect detection process may be any defect detection process known in the art that is capable of identifying one or more media defects associated with the channel over which the LDPC codeword was transferred. Any media defect flags generated by the media defect detection process are used to modify the output from the data detection process (block 385). The output of the data detection process includes soft data indicating the likelihood that corresponding bits have been properly detected. Thus, where a media defect is indicated, the soft output from the data detection process is modified for the bits corresponding to the identified media defect to indicate a reduced likelihood that the particular bits were properly detected. The output of the detection process including the modified soft data is provided to an LDPC decoder circuit where an LDPC decoding algorithm is applied to the data (block 395). Again, the LDPC decoding algorithm may be any LDPC decoding algorithm known in the art. The results of the LDPC decoding process are provided as an output.

Figure 4:
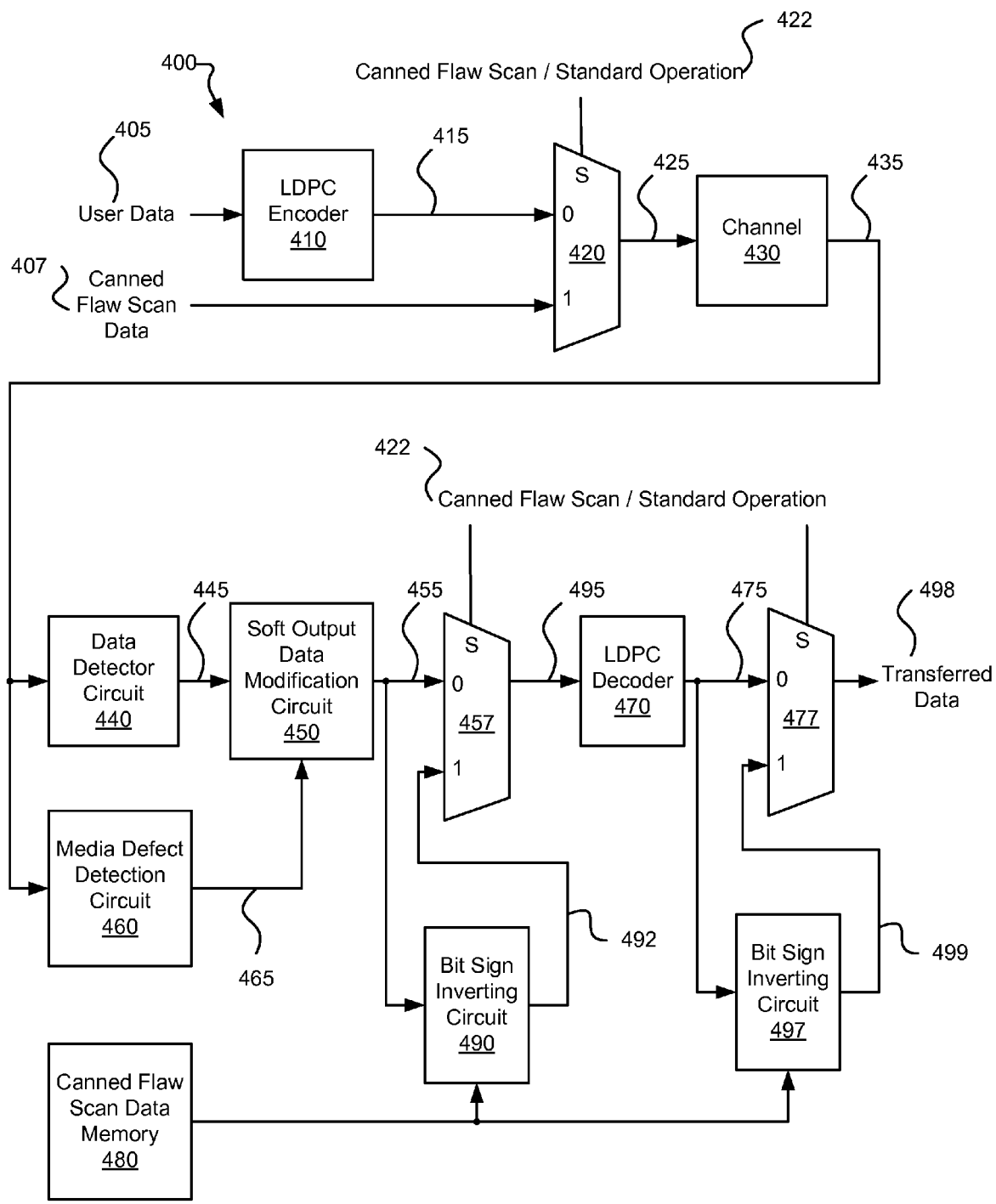
FIG. 4 is a block diagram of a data processing system including bit inverted flaw scan circuitry is shown in accordance with some embodiments of the present invention.

In the embodiment of FIG. 2, the pattern transferred by the channel is not necessarily periodic even if the originally provided canned flaw scan data is periodic. This is due to the addition of LDPC data by the LDPC encoder circuit. Upon inserting LDPC parity bits into the canned flaw scan data, the non-return to zero (nrz) data is no longer known, nor periodic. This reduces the effectiveness of any flaw scan testing directed at detecting flaws in the channel (e.g., flaws on the storage medium). Turning to FIG. 4, a block diagram of a data processing system 400 including bit inverted flaw scan circuitry is shown in accordance with some embodiments of the present invention. Data processing system 400 includes an LDPC encoder circuit 410 that receives a user input 405 that performs an LDPC encoding to yield an encoded output 415. The encoded output is the user data augmented with LDPC data as is known in the art. LDPC encoder circuit 410 may be any LDPC encoder circuit known in the art. Based upon the disclosure provided herein, one of ordinary skill in the art will recognize a variety of LDPC encoder circuits that may be used in relation to different embodiments of the present invention. User data input 405 includes user data that is being introduced to the system. Such user data may be any user data that is to be processed by the system.

Encoded output 415 is provided to one input of a multiplexer circuit 420 and a canned flaw scan data input 407 is provided to another input of multiplexer circuit 420. Canned flaw scan input 407 is a test pattern that is used to perform a flaw scan on a channel 430. In some embodiments of the present invention, canned flaw scan input 407 provides a known periodic data pattern that facilitates performance of a flaw scan test. In some embodiments of the present invention, a 2 T pattern is used (i.e., 001100110011 . . . ). In other embodiments of the present invention, a 4 T pattern is used (i.e., 0000111100001111 . . . ). It should be noted that non-periodic patterns may also be used. Based upon the disclosure provided herein, one of ordinary skill in the art will recognize a variety of patterns that may be introduced to data processing system 400 as canned flaw scan input 407. A canned flaw scan/standard operation input 422 selects a system data input 425 to be either encoded data input 415 or canned flaw scan input 407 depending upon whether a flaw scan or standard operation is desired.

System data input 425 is provided to channel 430. Channel 430 provides a channel output 435 that is received by a data detector circuit 440 and a media defect detector circuit 460. Channel 430 may be any channel including, but not limited to, a storage medium. Media defect detector circuit 460 performs a media defect detection on channel output 435. When a media defect is identified by media defect detector circuit 460, one or more media defect flags 465 are asserted. In one embodiment of the present invention, media defect detector circuit 460 may be implemented as that discussed below in relation to FIG. 8. It should be noted that other embodiments of the present invention may use different types of media defect detectors. For example, other embodiments of the present invention may be implemented consistent with those discussed in U.S. patent application Ser. No. 12/399,713 entitled "Systems and Methods for Media Defect Detection" and filed Mar. 6, 2009 by Tan et al.

Data detector circuit 440 applies a data detection algorithm to channel output 435 and provides a resulting detected output 445. Data detector circuit 440 may be any data detector circuit known in the art. In one embodiment of the present invention, data detector circuit 440 is a maximum a posteriori data detector circuit as are known in the art. Based upon the disclosure provided herein, one of ordinary skill in the art will recognize a variety of data detector circuits that may be used in relation to different embodiments of the present invention.

Detected output 445 is provided to a soft output data modification circuit 450. Soft output data modification circuit 450 operates to modify a soft output portion of detected output 445 based upon media defect flags 465. The soft output portion indicates a likelihood that a particular bit has been properly detected. Thus, where a media defect is indicated by media defect flags 465, the soft output portion of detected output 445 is modified for the bits corresponding to the identified media defect to indicate a reduced likelihood that the particular bits were properly detected. The following pseudocode describes the modification:

```
If (media defect flags indicate no media defect){
        modified output 455 = detected output 445
}
Else If (media defect flags indicate a media defect){
        modified output 455 = α*channel output 435
}
``` where $\alpha<1$. Modifying the soft output portion corresponding to an identified media defect increases the probability that bits corresponding to the identified media defect will be changed downstream in an effort to identify the originally transmitted data. Such an approach increases the potential of convergence.

Soft output data modification circuit 450 provides a modified output 455 to one input of a multiplexer circuit 457. A bit sign inverting circuit 490 receives a canned flaw scan data input 482 from a canned flaw scan data memory 480. Received canned flaw scan data input 482 is the same as canned flaw scan data input 407 originally provided to system 400. Bit sign inverting circuit 490 receives modified output 455 and changes the sign of each bit of soft data information included in modified output 455 where the corresponding bit of canned flaw scan data input 482 is a '1'. In contrast, the soft data information included in modified output 455 is unchanged where the corresponding bit of canned flaw scan data input 482 is a '0'. After changing the sign of bits corresponding to '1s' in canned flaw scan data input 482, bit sign inverting circuit 490 provides a modified output 492 to another input of multiplexer circuit 457. Multiplexer circuit 457 provides either modified output 455 or modified output 492 as a modified output 495 depending upon assertion of canned flaw scan/standard operation input 422. Again, canned flaw scan/standard operation input 422 is asserted depending upon whether a flaw scan or standard operation is desired. It should be noted that while bit sign inverting circuit 490 is discussed as changing the sign of a value, the change of sign is intended to modify the value to correspond to the opposite bit value. Thus, in other embodiments of the present invention, bit sign inverting circuit 490 may change the bit value from '1' to '0' or from '0' to '1' where the corresponding bit of canned flaw scan data input 482 is a '1'. In contrast, the output is unchanged where the corresponding bit of canned flaw scan data input 482 is a '0'.

By changing the sign of all bits corresponding to a '1' in canned flaw scan data input 482, the originally input canned flaw scan data input 407 is effectively changed to an all '0' input. An all '0' input is a valid LDPC codeword that will be processed properly by LDPC decoder circuit 470. However, where there is a flaw in channel 430, one or more bits of the expectedly all '0' codeword will not be a '0'. As such, it is no longer a valid LDPC codeword and will be unlikely to converge when LDPC decoding is applied.

Modified output 492 is provided to an LDPC decoder circuit 470. LDPC decoder circuit 470 applies an LDPC decoding algorithm to modified output 492 and provides a decoded output 475 to one input of a multiplexer circuit 477. In addition, decoded output 475 is provided to a bit sign inverting circuit 497. Bit sign inverting circuit 497 operates the same as bit sign inverting circuit 490 in that it flips the sign of each bit of the soft data portion of decoded output 475 where the corresponding bit of canned flaw scan data input 482 is a '1'. In contrast, the soft data information included in decoded output 475 is unchanged where the corresponding bit of canned flaw scan data input 482 is a '0'. By changing the sign of all bits corresponding to a '1' in canned flaw scan data input 482, the originally input canned flaw scan data input 407 is effectively recreated (i.e., the process of bit sign inverting circuit 490 is reversed). A modified output 499 is provided by bit sign inverting circuit 497 to another input of multiplexer circuit 477. Multiplexer circuit 477 provides either decoded output 475 or modified output 499 as a transferred data output 498 depending upon assertion of canned flaw scan/standard operation input 422. Again, canned flaw scan/standard operation input 422 is asserted depending upon whether a flaw scan or standard operation is desired.

Among other things, data processing system 400 provides an ability to select a canned flaw scan input 407 that may be particularly tailored for performing a flaw scan. Such a flaw scan may operate to detect one or more regions or portions of channel 430 that are not operating properly. The inoperative regions may be identified by differences in the canned flaw scan input 407 and the transferred data 498. By modifying the detected output to expectedly be all '0s', valid LDPC codewords will be provided to LDPC decoder circuit 470. Where a flaw in channel 430 causes the improper detection of one or more bits, an all '0' codeword will not be produced likely resulting in a convergence failure of LDPC decoder circuit 470. Such a convergence failure when a flaw scan is selected provides an indication that channel 430 is potentially flawed. In addition, by re-constructing the original canned flaw scan data input 407, another indication of a flawed channel is provided where transferred data 498 does not match canned flaw scan data 407. It should be noted that such an approach allows for greater flaw scan coverage of channel 430 as all bits of the data transferred via channel 430 are manipulable. In contrast, in the system of FIG. 2, only the user data portion of the processed LDPC codewords are manipulable and the LDPC data portion of the processed LDPC codewords are not manipulable. Thus, data processing system 400 provides a greater ability to perform flaw scan testing of the channel. In some embodiments of the present invention, soft output data modification circuit 450 is turned off. In such cases, detected output 445 is passed through without change and provided as modified output 455.

Figure 5:
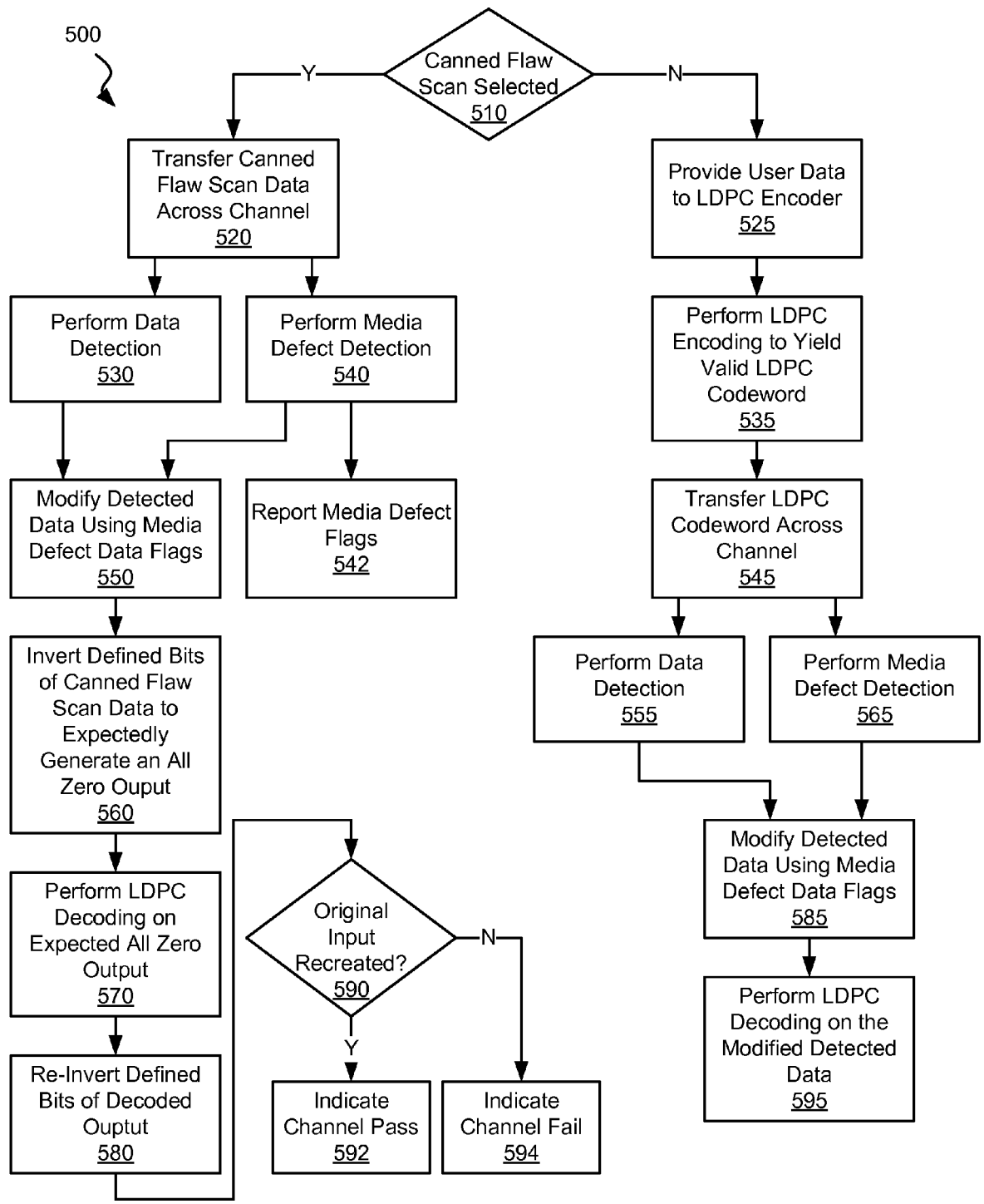
FIG. 5 is a block diagram of another method for flaw scan processing in accordance with other embodiments of the present invention.

Turning to FIG. 5, a flow diagram 500 shows a method for flaw scan processing in accordance with some embodiments of the present invention. Following flow diagram 500, it is determined whether a canned flaw scan process or standard operational mode is selected (block 510). Such a selection may be made by, but is not limited to, a signal input that is a asserted one way or another depending upon the mode selected or by programming a user register with a value indicating the selection of one mode or the other. Based upon the disclosure provided herein, one of ordinary skill in the art will recognize a variety of techniques that may be used for selecting an operational mode in accordance with different embodiments of the present invention.

Where a canned flaw scan process is selected (block 510), canned flaw scan data is transferred across a channel (block 520). The channel may be, for example, a storage medium or other channel as are known in the art. Where the channel is a storage medium, transferring the valid LDPC codeword through the channel includes writing the codeword to a defined location on the storage medium, and reading the LDPC codeword back from the defined location on the storage medium. Such a read/write process may be done using any read/write circuitry and/or processes known in the art.

A data detection process is performed on the canned flaw scan data received via the channel (block 530). The detection process may be performed using any detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention. In parallel, a media defect detection process is applied to the LDPC codeword received via the channel (block 540). The media defect detection process may be any defect detection process known in the art that is capable of identifying one or more media defects associated with the channel over which the LDPC codeword was transferred. Any media defects identified by the media defect detection process (block 540) are indicated by asserting one or more media defect flags that are reported as part of the flaw scan process (block 542). In addition, any media defect flags generated by the media defect detection process are used to modify the output from the data detection process (block 550). The output of the data detection process includes soft data indicating the likelihood that corresponding bits have been properly detected. Thus, where a media defect is indicated, the soft output from the data detection process is modified for the bits corresponding to the identified media defect to indicate a reduced likelihood that the particular bits were properly detected.

Bits in the detected output corresponding to the position of all '1s' in the originally received canned flaw scan data are inverted. Where the detected output is log likelihood ratio (LLR) data, the bit inversion is done by changing the sign of the LLR data at positions corresponding to the '1s' in the originally received canned flaw scan data (block 560). As an example, where the following LLR data is received {+1, +3, −1 . . . } that corresponds to a {0, 1, 0 . . . } portion of the canned flaw scan data, the following modified LLR data is produced: {+1, −3, −1 . . . }. Inverting the bits generates an all '0' codeword that is a valid LDPC codeword. Of note, this all '0' codeword is not necessarily expected where a flaw in the channel caused one or more bits in the codeword to be improperly transmitted as one or more non-zero bits may not be flipped, or one or more zero bits may be flipped such that they become non-zero.

The bit inverted output is provided to an LDPC decoder circuit where an LDPC decoding algorithm is applied to the data (block 570). Where there was no flaw in the channel, the bit inverted output should be an all zero (i.e., a valid LDPC codeword) data set that should converge when processed by the LDPC decoder. The LDPC decoding algorithm may be any LDPC decoding algorithm known in the art. The result of the LDPC decoding is processed through a data inversion process where bits in the detected output corresponding to the position of all '1s' in the originally received canned flaw scan data are inverted. Where the detected output is log likelihood ratio (LLR) data, the bit inversion is done by changing the sign of the LLR data at positions corresponding to the '1s' in the originally received canned flaw scan data (block 580). As an example, where the following LLR data is received {+1, +3, −1 . . . } that corresponds to a {0, 1, 0 . . . } portion of the canned flaw scan data, the following modified LLR data is produced: {+1, −3, −1 . . . }.

It is then determined whether the original flaw scan data was reproduced by the process (block 590). Where the original flaw scan data is reproduced (block 590), the channel is passed (block 592). Alternatively, where the original flaw scan data is reproduced (block 590), the channel fails (block 594).

Alternatively, where a standard operation process is selected (block 510), user data is provided to an LDPC encoder circuit (block 525). LDPC encoding is performed on the received user data to yield a valid LDPC codeword (i.e., an encoded data set) (block 535). The valid LDPC codeword is then transferred across the channel (block 545). A data detection process is performed on the LDPC codeword received via the channel (block 555). Again, the detection process may be performed using any detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention.

In parallel, the media defect detection process is applied to the LDPC codeword received via the channel (block 565). Again, the media defect detection process may be any defect detection process known in the art that is capable of identifying one or more media defects associated with the channel over which the LDPC codeword was transferred. Any media defect flags generated by the media defect detection process are used to modify the output from the data detection process (block 585). The output of the data detection process includes soft data indicating the likelihood that corresponding bits have been properly detected. Thus, where a media defect is indicated, the soft output from the data detection process is modified for the bits corresponding to the identified media defect to indicate a reduced likelihood that the particular bits were properly detected. The output of the detection process including the modified soft data is provided to an LDPC decoder circuit where an LDPC decoding algorithm is applied to the data (block 595). Again, the LDPC decoding algorithm may be any LDPC decoding algorithm known in the art. The results of the LDPC decoding process are provided as an output.

Figure 6:
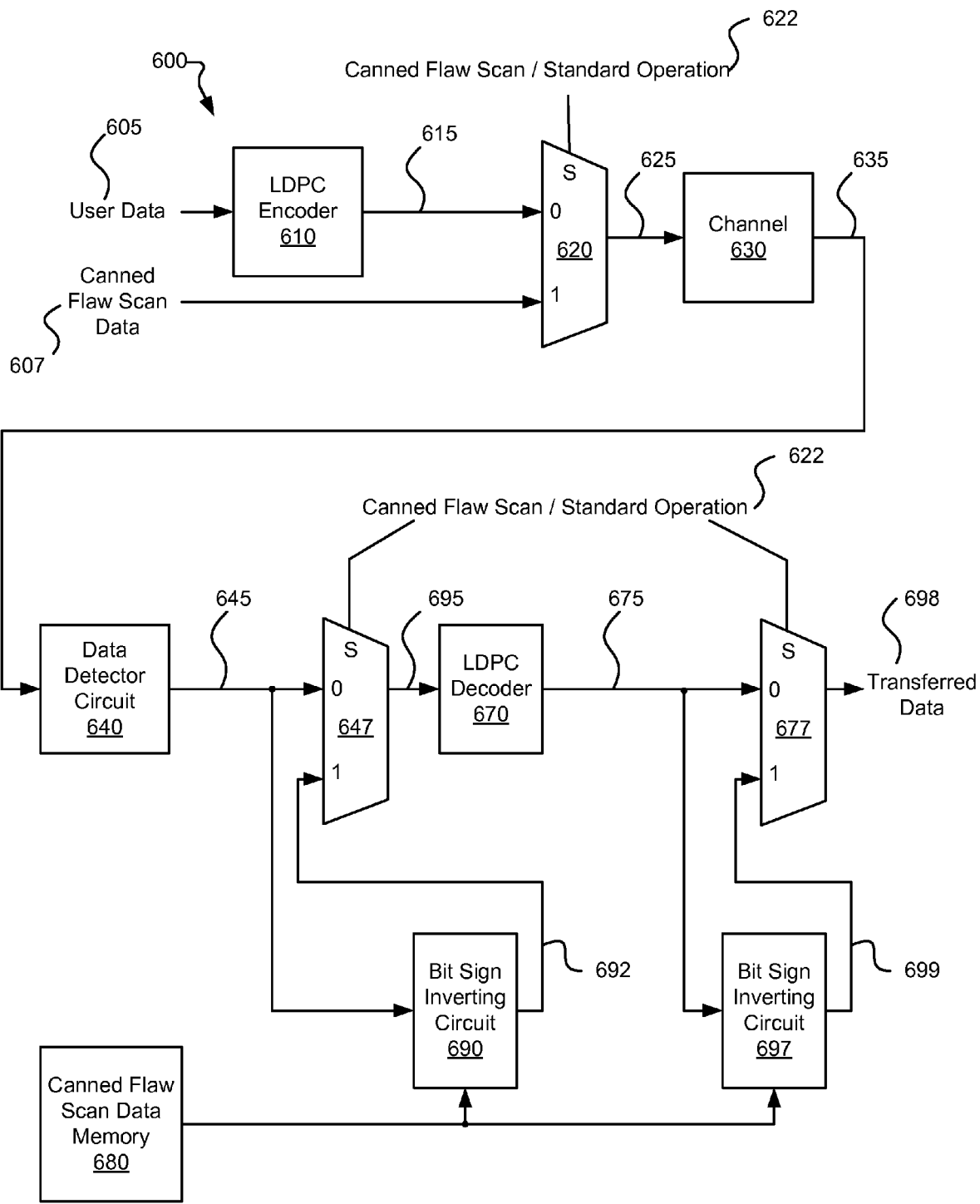
FIG. 6 is a block diagram of a data processing system including flaw scan circuitry relying on extended length user data processing in accordance with some embodiments of the present invention.

Turning to FIG. 6, a block diagram of another data processing system 600 including bit inverted flaw scan circuitry is shown in accordance with some embodiments of the present invention. Data processing system 600 includes an LDPC encoder circuit 610 that receives a user input 605 that performs an LDPC encoding to yield an encoded output 615. The encoded output is the user data augmented with LDPC data as is known in the art. LDPC encoder circuit 610 may be any LDPC encoder circuit known in the art. Based upon the disclosure provided herein, one of ordinary skill in the art will recognize a variety of LDPC encoder circuits that may be used in relation to different embodiments of the present invention. User data input 605 includes user data that is being introduced to the system. Such user data may be any user data that is to be processed by the system.

Encoded output 615 is provided to one input of a multiplexer circuit 620 and a canned flaw scan data input 607 is provided to another input of multiplexer circuit 620. Canned flaw scan input 607 is a test pattern that is used to perform a flaw scan on a channel 630. In some embodiments of the present invention, canned flaw scan input 607 provides a known periodic data pattern that facilitates performance of a flaw scan test. In some embodiments of the present invention, a 2 T pattern is used (i.e., 001100110011 . . . ). In other embodiments of the present invention, a 4 T pattern is used (i.e., 0000111100001111 . . . ). It should be noted that non-periodic patterns may also be used. Based upon the disclosure provided herein, one of ordinary skill in the art will recognize a variety of patterns that may be introduced to data processing system 600 as canned flaw scan input 607. A canned flaw scan/standard operation input 622 selects a system data input 625 to be either encoded data input 615 or canned flaw scan input 607 depending upon whether a flaw scan or standard operation is desired.

System data input 625 is provided to channel 630. Channel 630 provides a channel output 635 that is received by a data detector circuit 640. Channel 630 may be any channel including, but not limited to, a storage medium. Data detector circuit 640 applies a data detection algorithm to channel output 635 and provides a resulting detected output 645. Data detector circuit 640 may be any data detector circuit known in the art. In one embodiment of the present invention, data detector circuit 440 is a maximum a posteriori data detector circuit as are known in the art. Based upon the disclosure provided herein, one of ordinary skill in the art will recognize a variety of data detector circuits that may be used in relation to different embodiments of the present invention. Detected output 645 is provided to one input of a multiplexer circuit 647.

A bit sign inverting circuit 690 receives a canned flaw scan data input 682 from a canned flaw scan data memory 680. Received canned flaw scan data input 682 is the same as canned flaw scan data input 607 originally provided to system 600. Bit sign inverting circuit 690 receives detected output 645 and changes the sign of each bit of soft data information included in detected output 645 where the corresponding bit of canned flaw scan data input 682 is a '1'. In contrast, the soft data information included in detected output 645 is unchanged where the corresponding bit of canned flaw scan data input 682 is a '0'. After changing the sign of bits corresponding to '1s' in canned flaw scan data input 682, bit sign inverting circuit 690 provides a modified output 692 to another input of multiplexer circuit 647. Multiplexer circuit 647 provides either detected output 645 or modified output 692 as a modified output 695 depending upon assertion of canned flaw scan/standard operation input 622. Again, canned flaw scan/standard operation input 622 is asserted depending upon whether a flaw scan or standard operation is desired. It should be noted that while bit sign inverting circuit 690 is discussed as changing the sign of a value, the change of sign is intended to modify the value to correspond to the opposite bit value. Thus, in other embodiments of the present invention, bit sign inverting circuit 690 may change the bit value from '1' to '0' or from '0' to '1' where the corresponding bit of canned flaw scan data input 682 is a '1'. In contrast, the output is unchanged where the corresponding bit of canned flaw scan data input 682 is a '0'.

By changing the sign of all bits corresponding to a '1' in canned flaw scan data input 682, the originally input canned flaw scan data input 607 is effectively changed to an all '0' input. An all '0' input is a valid LDPC codeword that will be processed properly by LDPC decoder circuit 670. However, where there is a flaw in channel 630, one or more bits of the expectedly all '0' codeword will not be a '0'. As such, it is no longer a valid LDPC codeword and will be unlikely to converge when LDPC decoding is applied.

Modified output 692 is provided to an LDPC decoder circuit 670. LDPC decoder circuit 670 applies an LDPC decoding algorithm to modified output 692 and provides a decoded output 675 to one input of a multiplexer circuit 677. In addition, decoded output 675 is provided to a bit sign inverting circuit 697. Bit sign inverting circuit 697 operates the same as bit sign inverting circuit 690 in that it flips the sign of each bit of the soft data portion of decoded output 675 where the corresponding bit of canned flaw scan data input 682 is a '1'. In contrast, the soft data information included in decoded output 675 is unchanged where the corresponding bit of canned flaw scan data input 682 is a '0'. By changing the sign of all bits corresponding to a '1' in canned flaw scan data input 682, the originally input canned flaw scan data input 607 is effectively recreated (i.e., the process of bit sign inverting circuit 490 is reversed). A modified output 699 is provided by bit sign inverting circuit 697 to another input of multiplexer circuit 677. Multiplexer circuit 677 provides either decoded output 675 or modified output 699 as a transferred data output 698 depending upon assertion of canned flaw scan/standard operation input 622. Again, canned flaw scan/standard operation input 622 is asserted depending upon whether a flaw scan or standard operation is desired.

Among other things, data processing system 600 provides an ability to select a canned flaw scan input 607 that may be particularly tailored for performing a flaw scan. Such a flaw scan may operate to detect one or more regions or portions of channel 630 that are not operating properly. The inoperative regions may be identified by differences in the canned flaw scan input 607 and the transferred data 698. By modifying the detected output to expectedly be all '0s', valid LDPC codewords will be provided to LDPC decoder circuit 670. Where a flaw in channel 630 causes the improper detection of one or more bits, an all '0' codeword will not be produced likely resulting in a convergence failure of LDPC decoder circuit 670. Such a convergence failure when a flaw scan is selected provides an indication that channel 630 is potentially flawed. In addition, by re-constructing the original canned flaw scan data input 607, another indication of a flawed channel is provided where transferred data 698 does not match canned flaw scan data 607. It should be noted that such an approach allows for greater flaw scan coverage of channel 630 as all bits of the data transferred via channel 630 are manipulable. In contrast, in the system of FIG. 2, only the user data portion of the processed LDPC codewords are manipulable and the LDPC data portion of the processed LDPC codewords are not manipulable. Thus, data processing system 600 provides a greater ability to perform flaw scan testing of the channel. In some embodiments of the present invention, soft output data modification circuit 650 is turned off. In such cases, detected output 645 is passed through without change and provided as modified output 655.

Figure 7:
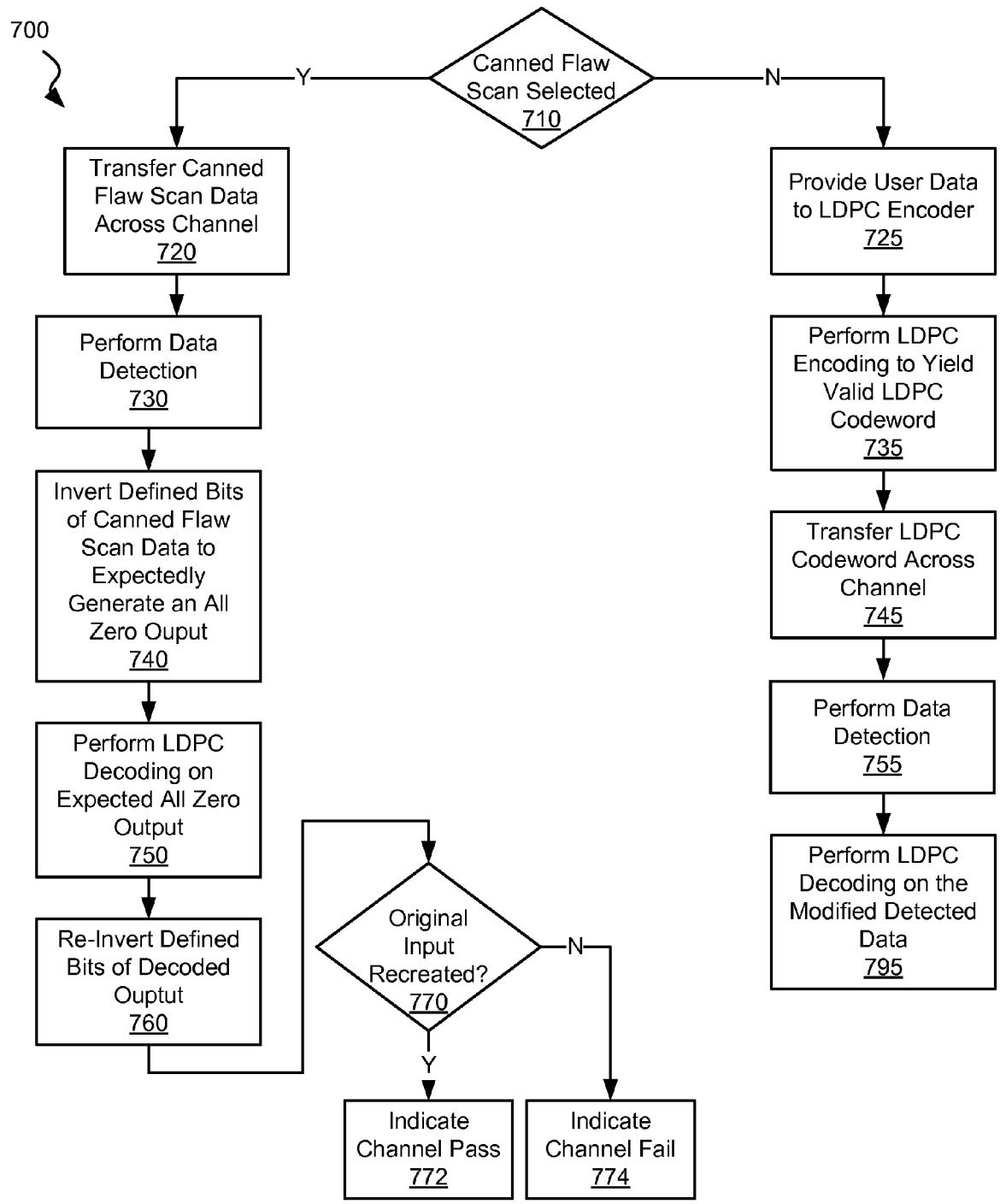
FIG. 7 is a block diagram of yet another method for flaw scan processing in accordance with other embodiments of the present invention.

Turning to FIG. 7, a flow diagram 700 shows a method for flaw scan processing in accordance with some embodiments of the present invention. Following flow diagram 700, it is determined whether a canned flaw scan process or standard operational mode is selected (block 710). Such a selection may be made by, but is not limited to, a signal input that is a asserted one way or another depending upon the mode selected or by programming a user register with a value indicating the selection of one mode or the other. Based upon the disclosure provided herein, one of ordinary skill in the art will recognize a variety of techniques that may be used for selecting an operational mode in accordance with different embodiments of the present invention.

Where a canned flaw scan process is selected (block 710), canned flaw scan data is transferred across a channel (block 720). The channel may be, for example, a storage medium or other channel as are known in the art. Where the channel is a storage medium, transferring the valid LDPC codeword through the channel includes writing the codeword to a defined location on the storage medium, and reading the LDPC codeword back from the defined location on the storage medium. Such a read/write process may be done using any read/write circuitry and/or processes known in the art.

A data detection process is performed on the canned flaw scan data received via the channel (block 730). The detection process may be performed using any detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention. Bits in the detected output corresponding to the position of all '1s' in the originally received canned flaw scan data are inverted (block 740). Where the detected output is log likelihood ratio (LLR) data, the bit inversion is done by changing the sign of the LLR data at positions corresponding to the '1s' in the originally received canned flaw scan data (block 740). As an example, where the following LLR data is received {+1, +3, −1 . . . } that corresponds to a {0, 1, 0 . . . } portion of the canned flaw the following modified LLR data is produced: {+1, −3, −1 . . . }. Inverting the bits generates an all '0' codeword that is a valid LDPC codeword. Of note, this all '0' codeword is not necessarily expected where a flaw in the channel caused one or more bits in the codeword to be improperly transmitted as one or more non-zero bits may not be flipped, or one or more zero bits may be flipped such that they become non-zero.

The bit inverted output is provided to an LDPC decoder circuit where an LDPC decoding algorithm is applied to the data (block 750). Where there was no flaw in the channel, the bit inverted output should be an all zero (i.e., a valid LDPC codeword) data set that should converge when processed by the LDPC decoder. The LDPC decoding algorithm may be any LDPC decoding algorithm known in the art. The result of the LDPC decoding is processed through a data inversion process where bits in the detected output corresponding to the position of all '1s' in the originally received canned flaw scan data are inverted. Where the detected output is log likelihood ratio (LLR) data, the bit inversion is done by changing the sign of the LLR data at positions corresponding to the '1s' in the originally received canned flaw scan data (block 580). As an example, where the following LLR data is received {+1, +3, −1 . . . } that corresponds to a {0, 1, 0 . . . } portion of the canned flaw scan data, the following modified LLR data is produced: {+1, −3, −1 . . . }.

It is then determined whether the original flaw scan data was reproduced by the process (block 770). Where the original flaw scan data is reproduced (block 770), the channel is passed (block 772). Alternatively, where the original flaw scan data is reproduced (block 770), the channel fails (block 774).

Alternatively, where a standard operation process is selected (block 710), user data is provided to an LDPC encoder circuit (block 725). LDPC encoding is performed on the received user data to yield a valid LDPC codeword (i.e., an encoded data set) (block 735). The valid LDPC codeword is then transferred across the channel (block 5745). A data detection process is performed on the LDPC codeword received via the channel (block 5755). Again, the detection process may be performed using any detection algorithm known in the art including, but not limited to, a maximum a posteriori detection process or a Viterbi algorithm detection process. Based upon the disclosure provided herein, one of ordinary skill in the art will recognize a variety of detection processes that may be used in relation to different embodiments of the present invention. The output of the detection process is provided to an LDPC decoder circuit where an LDPC decoding algorithm is applied to the data (block 795). Again, the LDPC decoding algorithm may be any LDPC decoding algorithm known in the art. The results of the LDPC decoding process are provided as an output.

Figure 8:
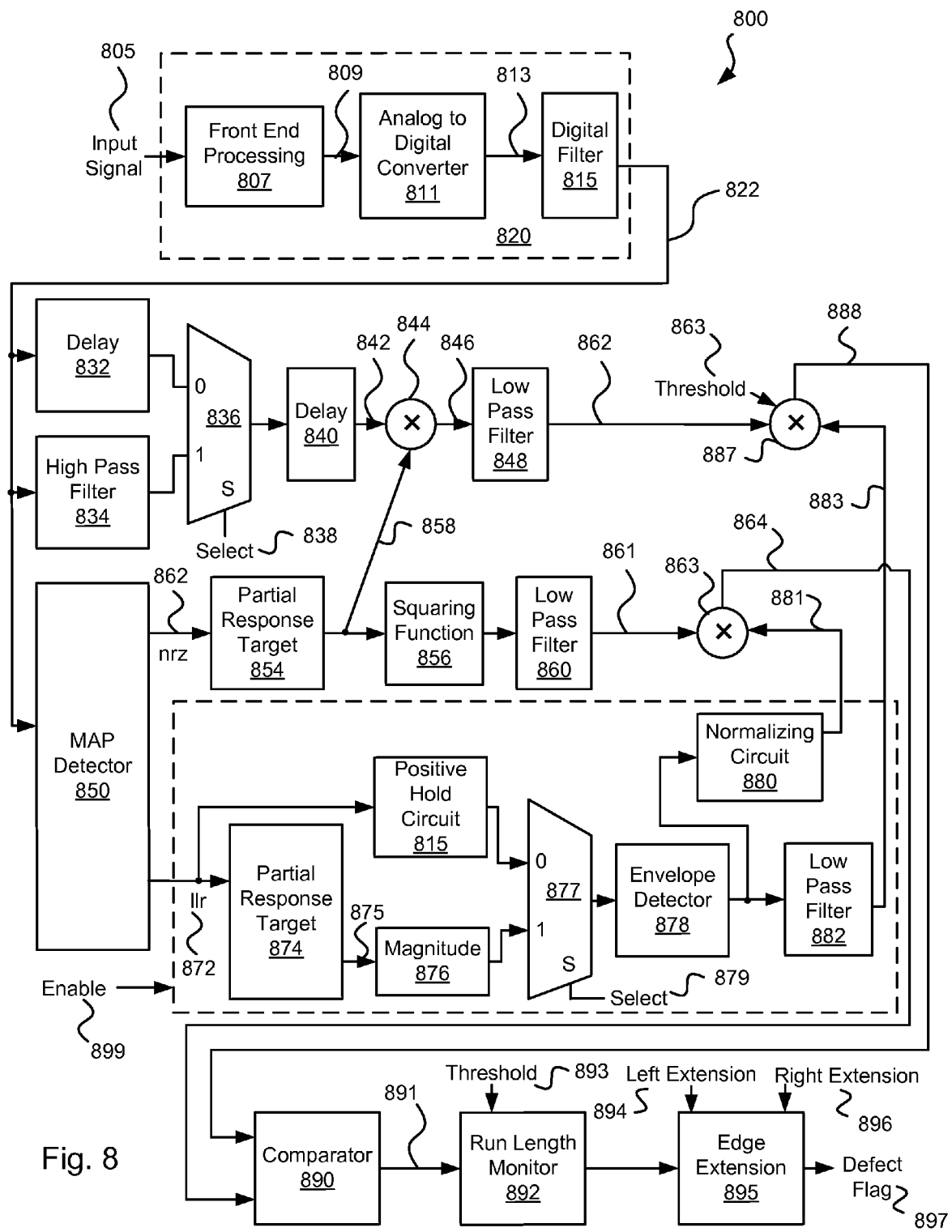
FIG. 8 shows one particular implementation of a media defect detector that may be used in relation to some embodiments of the present invention.

Turning to FIG. 8, a particular implementation of a media defect detector 800 is shown in accordance with some embodiments of the present invention. Media defect detector 800 is more fully described in U.S. patent application Ser. No. 12/399,713 entitled "Systems and Methods for Enhanced Media Defect Detection" filed Mar. 6, 2009 by Tan et al. The aforementioned patent application is incorporated herein by reference for all purposes. Media defect detector 800 includes an input circuit 820 that is responsible for receiving and sampling a data input 805. Data input 805 is provided by a read/write head assembly (not shown) disposed in relation to a storage medium (not shown). Input circuit 820 includes a front end processing circuit 807 that applies, among other things, amplification and/or analog filtering to input signal 805 and provides an analog signal 809 to an analog to digital converter 811. Analog to digital converter 811 samples analog signal 809 at a sampling rate and provides a series of digital samples 813. Analog to digital converter 811 may be any circuit known in the art that is capable of converting an analog signal to a series of digital samples. Digital samples 813 are filtered using a digital filter 815 that provides data samples 822. In some cases, digital filter 815 is a ten tap digital finite impulse response filter as is known in the art. Based upon the disclosure provided herein, one of ordinary skill in the art will recognize a variety digital filters that may be used in relation to different embodiments of the present invention.

Data samples 822 are provided in parallel to a delay circuit 832, a high pass filter 834, and a MAP data detector 850. MAP data detector 850 performs a maximum a posteriori data detection on data samples 822 as is known in the art. This data detection process produces both a hard output (nrz) 852 and a soft output (llr) 872. Hard output 852 is a series of determined values for each bit period of the input bit stream, and the corresponding soft output 872 indicates a likelihood that the respective hard output 852 is correctly determined. In some embodiments of the present invention, hard output 852 is either a 'positive 1' or a 'negative 1', and soft output 872 is a log-likelihood ratio representing the probability that the corresponding hard output 852 is accurate. In one case, soft output 872 is a value between negative thirty-two and positive thirty-two with the lowest value corresponding to the lowest probability and the highest value corresponding to the highest probability.

Hard output 852 is provided to a partial response target filter 854. Partial response target filter 854 provides a partial response output 858 to a squaring function 856. In some cases, partial response target filter 854 is a two tap digital finite impulse response filter as is known in the art. Partial response output 858 is provided to a squaring function 856 to create a squared output (i.e., $f(x)=x^2$). The squared output is provided to a low pass filter 860 that filters the received input and provides a filtered output 861. Low pass filter 860 may be any low pass filter known in the art. In one particular embodiment, low pass filter 860 is a thirty-two bit MA filter as are known in the art. In addition, partial response output 858 is provided to a multiplier circuit 844.

Soft output 872 is provided to a partial response target filter 874 and to a positive hold circuit 815. Positive hold circuit 815 may be used to yield a magnitude value in accordance with the following pseudocode:

```
If (input_i >= 0){
        Output = input_i }
Else {
        Output = input_{i-1} },
``` where $input_i$ is the current soft output 872, $input_{i-1}$ is the preceding soft output 872, and output is the output provided by positive hold circuit 815. The output of positive hold circuit 815 is provided to a multiplexer 877. In some cases, partial response target filter 874 is a two tap digital finite impulse response filter as is known in the art. Based upon the disclosure provided herein, one of ordinary skill in the art will recognize other partial response target filters that may be used in relation to different embodiments of the present invention. A partial response output 875 from partial response target filter 874 is provided to a magnitude function 876. Magnitude function 876 returns the absolute value of partial response output 875, and the magnitude is provided to multiplexer 877. Depending upon the assertion level of a select input 879, multiplexer 877 provides either the magnitude output from magnitude function 876 or the output of positive hold circuit 815 to an envelope detector 878. Envelope detector 878 may be any envelope detector known in the art. In one particular embodiment of the present invention, envelope detector 878 operates in accordance with the following pseudocode:

```
If (input_i > input_{i-1}){
        output = input_i
}
Else{
        output = input_i − envelope decay
},
``` where $input_i$ is the current output from multiplexer 877, $input_{i-1}$ is the preceding output from multiplexer 877, and envelope decay is a programmable decay value used by envelope detector 878. The resulting output of envelope detector 878 is provided to a low pass filter 882 that provides a filtered output 883.

The output of envelope detector 878 is provided to a normalizing circuit 880. Normalizing circuit 880 operates to normalize the output of envelope detector 878 to one. A normalized output 881 from normalizing circuit 880 provides a probability where one is equivalent to a high probability and other values down to zero correspond to respectively lower probabilities. Normalized output 881 is provided along with filtered output 861 to a multiplier 863. A multiplication product 864 from multiplier 863 is filtered output 861 attenuated by the probability value represented by normalized output 881.

Data samples 822 are provided in parallel to a delay circuit 832 and a high pass filter 834. In some embodiments of the present invention, high pass filter 834 is a thirty-two bit MA filter as are known in the art. Based upon the disclosure provided herein, one of ordinary skill in the art will recognize a variety of high pass filters that may be used in relation to different embodiments of the present invention. Delay circuit 832 delays the received signal by a time period corresponding to the time required to pass through high pass filter 834. A multiplexer 836 selects either the output of high pass filter 834 or the output of delay circuit 832 based upon a select input 838. The selected output from multiplexer 836 is provided to a delay circuit 840. Delay circuit 840 provides a delayed output 842 that is delayed in time by an amount corresponding to the time used by MAP detector circuit 850 and a partial response target filter 854. Said another way, delay circuit 840 operates to align delayed output 842 with partial response output 858 (i.e., to assure that each output is derived from the same data samples 822). Multiplier circuit 844 multiplies delayed output 842 by partial response output 858 to yield a multiplication product output 846. Product output 846 is provided to a low pass filter 848 that in turn provides a low pass filtered signal 862.

Low pass filtered signal 862, filtered output 883 and a threshold value 863 are multiplied by a multiplier circuit 887 to provide a multiplication product 888 in accordance with the following equation:

Multiplication Product 888=(Threshold 863)*(Low Pass Filtered Signal 862)*(Filtered Output 883).

Multiplication product 888 is compared with a multiplication product 864 using a comparator 890. Where multiplication product 888 is less than multiplication product 864, a defect signal 891 is asserted to indicate a media defect is found. Otherwise, no media defect is found.

Defect signal 891 is provided to a run length monitor circuit 892 that requires assertion of defect signal 891 for a programmable threshold number 893 of cycles before a defect is indicated. Once a defect is indicated by run length monitor 892, an edge extension circuit 895 marks the beginning and end of a corresponding defective region using a programmable right extension value 694 and a programmable left extension value 896. Run length monitor 892 and edge extender circuit 895 may be implemented similar to that disclosed in U.S. patent application Ser. No. 12/111,255 entitled "Systems and Methods for Media Defect Detection Utilizing Correlated DFIR and LLR Data", and filed Apr. 29, 2008 by Tan et al. The entirety of the aforementioned reference is incorporated herein by reference for all purposes.

Figure 9:
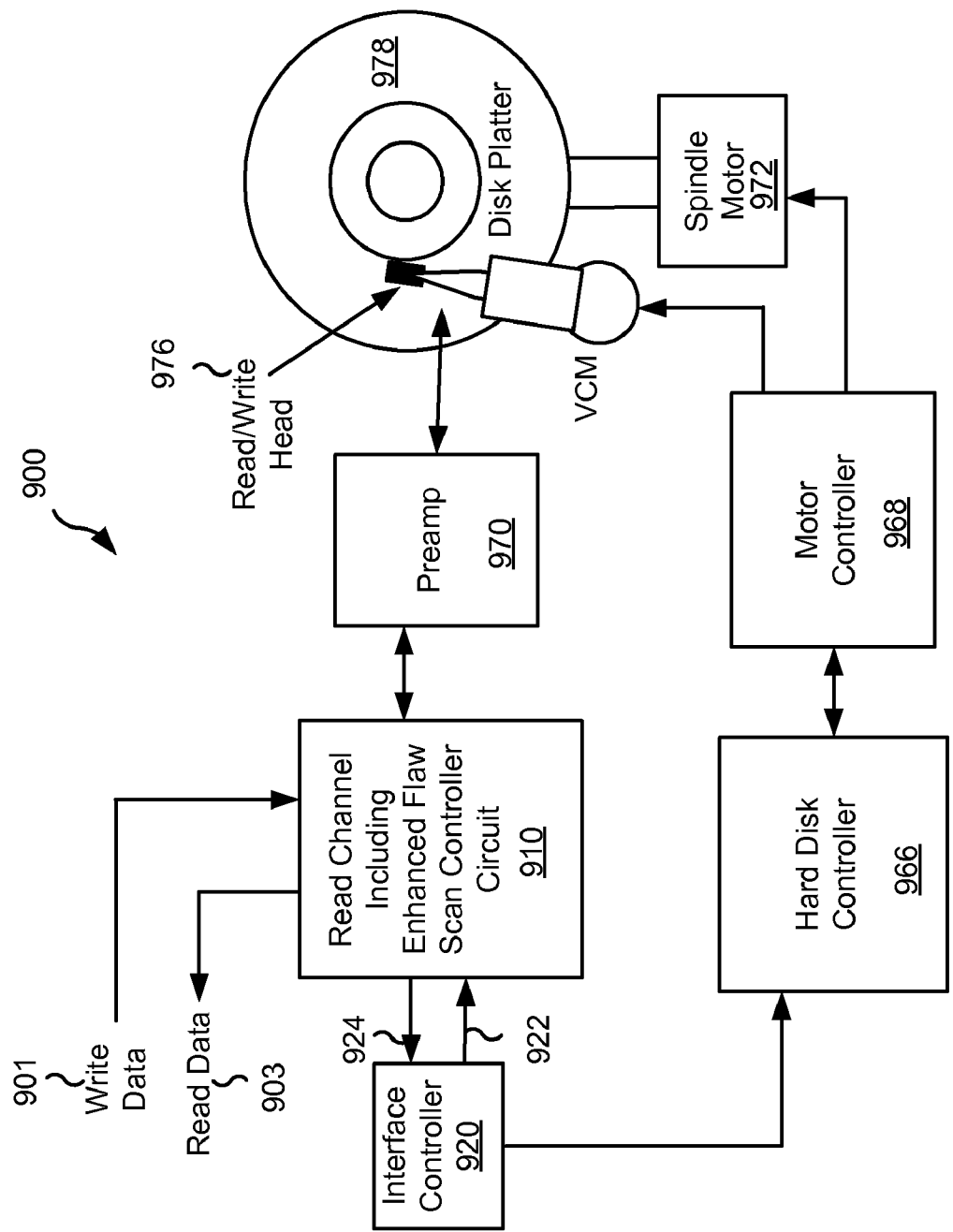
FIG. 9 depicts a storage system including a media defect detector circuit in accordance with various embodiments of the present invention.

Turning to FIG. 9, a storage system 900 including a read channel 910 with an enhanced flaw scan controller circuit is shown in accordance with various embodiments of the present invention. Storage system 900 may be, for example, a hard disk drive. Storage system 900 also includes a preamplifier 970, an interface controller 920, a hard disk controller 966, a motor controller 968, a spindle motor 972, a disk platter 978, and a read/write head 976. Interface controller 920 controls addressing and timing of data to/from disk platter 978. The data on disk platter 978 consists of groups of magnetic signals that may be detected by read/write head assembly 976 when the assembly is properly positioned over disk platter 978. In one embodiment, disk platter 978 includes magnetic signals recorded in accordance with a perpendicular recording scheme. Defect information may be provided to a mapping control module (not shown) that is operable to receive indications of one or more regions of disk platter 978 that are defective, and to map the regions such that they are not used as is known in the art.

In a typical read operation, read/write head assembly 976 is accurately positioned by motor controller 968 over a desired data track on disk platter 978. Motor controller 968 both positions read/write head assembly 976 in relation to disk platter 978 and drives spindle motor 972 by moving read/write head assembly to the proper data track on disk platter 978 under the direction of hard disk controller 966. Spindle motor 972 spins disk platter 978 at a determined spin rate (RPMs). Once read/write head assembly 978 is positioned adjacent the proper data track, magnetic signals representing data on disk platter 978 are sensed by read/write head assembly 976 as disk platter 978 is rotated by spindle motor 972. The sensed magnetic signals are provided as a continuous, minute analog signal representative of the magnetic data on disk platter 978. This minute analog signal is transferred from read/write head assembly 976 to read channel module 910 via preamplifier 970. Preamplifier 970 is operable to amplify the minute analog signals accessed from disk platter 978. In turn, read channel module 910 decodes and digitizes the received analog signal to recreate the information originally written to disk platter 978. This data is provided as read data 903 to a receiving circuit. A write operation is substantially the opposite of the preceding read operation with write data 901 being provided to read channel module 910. This data is then encoded and written to disk platter 978.

The enhanced media defect detector circuit may be similar to those discussed above in relation to FIG. 2, FIG. 4 or FIG. 6, and/or may operate similar to that discussed above in relation to FIG. 3, FIG. 5 or FIG. 7. Such enhanced media defect detector circuits are capable of identifying media defects on disk platter 978.

In conclusion, the invention provides novel systems, devices, methods and arrangements for performing flaw scans on a data processing system. While detailed descriptions of one or more embodiments of the invention have been given above, various alternatives, modifications, and equivalents will be apparent to those skilled in the art without varying from the spirit of the invention. For example, it is disclosed that the bit inversion process expectedly generates an all '0' codeword that is a valid LDPC codeword, but the bit flipping may be modified to yield any valid LDPC codeword. For example, the bit inversion process may be designed to expectedly generate an all '1' LDPC codeword. Therefore, the above description should not be taken as limiting the scope of the invention, which is defined by the appended claims.

What is claimed is:

1. A data processing system, the system comprising:
    a data input;
    a verification input;
    a selector circuit, wherein the selector circuit selects one of a derivative of the data input and a derivative of the verification input to be provided as a selected input to a channel;
    a data detector circuit, wherein the data detector circuit applies a data detection algorithm to an output from the channel to yield a detected output; and
    a decoder circuit, wherein the decoder circuit applies a decoding algorithm to a derivative of the detected output to yield a decoded output.

2. The data processing system of claim 1, wherein the decoder circuit is an LDPC decoder circuit, wherein the derivative of the data input is the data input, wherein the derivative of the verification input is the verification input, and wherein the selected input is provided to the channel via an LDPC encoder circuit such that the data received by the channel is a valid LDPC codeword.

3. The data processing system of claim 1, wherein the data processing system further comprises:
    a media defect detection circuit, wherein the media defect detection circuit is operable to receive the output from the channel and to assert a media defect flag when a flaw in the channel is detected; and
    a soft output data modification circuit, wherein the soft output data modification circuit is operable to modify the detected output for periods corresponding to assertion of the media defect flag to yield the derivative of the detected output.

4. The data processing system of claim 3, wherein the selected input is a valid LDPC codeword when the derivative of the data input is provided as the selected input to the channel.

5. The data processing system of claim 3, wherein the selected input is an invalid LDPC codeword when the derivative of the verification input is provided as the selected input to the channel.

6. The data processing system of claim 4, wherein the derivative of the detected output is a first derivative of the detected output; wherein the selector circuit is a first selector circuit, and wherein the system further comprises:
    a bit sign inverting circuit, wherein the bit sign inverting circuit modifies the sign of one or more elements of a second derivative of the detected output to yield a third derivative of the detected output; and
    a second selector circuit, wherein the second selector circuit selects one of the second derivative of the detected output and the third derivative of the detected output to be provided as the first derivative of the detected output.

7. The data processing system of claim 6, wherein the second selector circuit selects the second derivative of the detected output to be provided as the first derivative of the detected output when the first selector circuit selects the derivative of the data input to be provided as a selected input to a channel, and wherein the second selector circuit selects the third derivative of the detected output to be provided as the first derivative of the detected output when the first selector circuit selects the derivative of the verification input to be provided as a selected input to a channel.

8. The data processing system of claim 6, wherein the third derivative of the detected output is an expected valid LDPC codeword.

9. The data processing system of claim 8, wherein the bit sign inverting circuit modifies the sign of each element of the second derivative of the detected output that corresponds to a '1' in the verification input.

10. The data processing system of claim 6, wherein the data processing system further comprises:
    a media defect detection circuit, wherein the media defect detection circuit is operable to receive the output from the channel and to assert a media defect flag when a flaw in the channel is detected; and a soft output data modification circuit, wherein the soft output data modification circuit is operable to modify the detected output for periods corresponding to assertion of the media defect flag to yield the second derivative of the detected output.

11. The data processing system of claim 1, wherein the decoder circuit is an LDPC decoder circuit, wherein the derivative of the verification input is the verification input, and wherein the system further comprises:
an LDPC encoder circuit, wherein the LDPC encoder circuit encodes the data input to yield the derivative of the data input.

12. A data processing circuit, the data processing circuit comprising:
a data detector circuit, wherein the data detector circuit receives a verification data set, wherein the verification data set is an invalid LDPC codeword, and wherein the data detector circuit applies a data detection algorithm to the verification data set to yield a detected output;
a bit sign inverting circuit, wherein the bit sign inverting circuit modifies the sign of one or more elements of a first derivative of the detected output to yield a second derivative of the detected output, and wherein the second derivative of the detected output is an expected valid LDPC codeword; and
an LDPC decoder circuit, wherein the LDPC decoder circuit applies a decoding algorithm to the second derivative of the detected output to yield a decoded output.

13. The data processing circuit of claim 12, wherein the bit sign inverting circuit is a first bit sign inverting circuit, and wherein the data processing circuit further comprises:
a second bit sign inverting circuit, wherein the second bit sign inverting circuit modifies the sign of one or more elements of the decoded output to yield a modified output.

14. The data processing circuit of claim 13, wherein the first bit sign inverting circuit modifies the sign of each element of the first derivative of the detected output that corresponds to a '1' in the verification data set, and wherein the second bit sign inverting circuit modifies the sign of each element of the decoded output that corresponds to a '1' in the verification data set.

15. The data processing circuit of claim 12, wherein the verification data set is received via a channel; and wherein the data processing circuit further comprises:
a media defect detection circuit, wherein the media defect detection circuit is operable to receive the verification data set and to assert a media defect flag when a flaw in the channel is detected; and
a soft output data modification circuit, wherein the soft output data modification circuit is operable to modify the detected output for periods corresponding to assertion of the media defect flag to yield the first derivative of the detected output.

16. The data processing circuit of claim 12, wherein the first derivative of the detected output is the detected output.

17. The data processing circuit of claim 12, wherein the bit sign inverting circuit modifies the sign of each element of the first derivative of the detected output that corresponds to a '1' in the verification data set.

18. A method for data processing, the method comprising:
receiving a verification data set, wherein the verification data set is an invalid LDPC codeword;
applying a data detection algorithm to the verification data set to yield a detected output;
modifying the sign of one or more element of the first derivative of the detected output to yield a second derivative of the detected output, wherein the second derivative of the detected output is an expected valid LDPC codeword; and
applying an LDPC decoding algorithm to the second derivative of the detected output.

19. The method of claim 18, wherein modifying the sign of one or more element of the first derivative of the detected output includes modifying the sign of each element of the first derivative of the detected output that corresponds to a '1' in the verification data set.

20. The method of claim 18, wherein the method further comprises:
performing a media defect detection on the verification data set to yield a media defect indication;
modifying a soft output portion of the detected output based upon the media defect indication to yield the first derivative of the detected output.

21. The method of claim 18, wherein the first derivative of the detected output is the detected output.

22. A hard disk drive system, the hard disk drive system comprising:
a storage medium;
a read/write head assembly disposed in relation to the storage medium;
a read channel circuit, wherein the read channel circuit receives a verification data set from the storage medium via the read/write head assembly, wherein the verification data set is an invalid LDPC codeword, and wherein the read channel circuit includes:
a data detector circuit, wherein the data detector circuit receives the verification data set, wherein the verification data set is an invalid LDPC codeword, and wherein the data detector circuit applies a data detection algorithm to the verification data set to yield a detected output;
a bit sign inverting circuit, wherein the bit sign inverting circuit modifies the sign of one or more elements of a first derivative of the detected output to yield a second derivative of the detected output, and wherein the second derivative of the detected output is an expected valid LDPC codeword; and
an LDPC decoder circuit, wherein the LDPC decoder circuit applies a decoding algorithm to the second derivative of the detected output to yield a decoded output.

* * * * *